(12) United States Patent
Dennis et al.

(10) Patent No.: US 7,953,508 B2
(45) Date of Patent: May 31, 2011

(54) QUALITY CONTROL SYSTEM AND METHOD THEREOF

(75) Inventors: Jason J. Dennis, Breslau (CA); Gary Lee, Cambridge (CA); Sorin Buse, Kitchener (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 435 days.

(21) Appl. No.: 12/060,527

(22) Filed: Apr. 1, 2008

(65) Prior Publication Data

US 2009/0149983 A1 Jun. 11, 2009

(51) Int. Cl.
*G06F 19/00* (2011.01)
(52) U.S. Cl. ......................... 700/101; 700/115
(58) Field of Classification Search .......... 700/101–115, 700/73, 76, 89, 273; 705/8–10
See application file for complete search history.

(56) References Cited

U.S. PATENT DOCUMENTS

| | | | |
|---|---|---|---|
| 5,623,412 A | 4/1997 | Masson et al. | |
| 6,138,081 A | 10/2000 | Olejack et al. | |
| 6,263,265 B1 | 7/2001 | Fera | |
| 6,382,034 B1 | 5/2002 | Yasui et al. | |
| 6,480,810 B1 | 11/2002 | Cardella et al. | |
| 6,618,629 B2 * | 9/2003 | Martens et al. | 700/9 |
| 6,643,600 B2 | 11/2003 | Yanosik, Jr. et al. | |
| 6,721,631 B2 | 4/2004 | Shimizu et al. | |
| 7,059,202 B2 | 6/2006 | Stanos et al. | |
| 2002/0198618 A1 * | 12/2002 | Madden et al. | 700/101 |
| 2003/0200130 A1 * | 10/2003 | Kall et al. | 705/8 |
| 2004/0254675 A1 * | 12/2004 | Derson et al. | 700/213 |
| 2004/0264581 A1 | 12/2004 | Perry | |
| 2006/0020357 A1 * | 1/2006 | Bournas et al. | 700/96 |
| 2006/0253217 A1 * | 11/2006 | Moulds et al. | 700/115 |
| 2007/0016429 A1 * | 1/2007 | Bournas et al. | 705/1 |
| 2007/0112469 A1 * | 5/2007 | Hara | 700/279 |
| 2008/0034895 A1 | 2/2008 | McCarthy et al. | |

FOREIGN PATENT DOCUMENTS

| | | |
|---|---|---|
| CA | 2506460 | 11/2005 |
| DE | 102007010768 | 9/2007 |
| JP | 2004257779 | 9/2004 |

* cited by examiner

*Primary Examiner* — Kidest Bahta
(74) *Attorney, Agent, or Firm* — Gifford, Krass, Sprinkle, Anderson & Citkowski, P.C.

(57) ABSTRACT

A quality control system and method for monitoring an assembly operation is provided. The method can include: (1) providing an assembly line having a plurality of machines being assembled thereon; (2) providing a tool for performing an assembly operation; (3) performing a plurality of the assembly operations with the tool; (4) measuring a measurable parameter indicative of the performance of the tool for at least a subset of the plurality of assembly operations; (5) storing the measured values in an electronic format with a data collection device; (6) analyzing the measured values; and (7) providing a signal based on the analysis with the signal indicative of at least satisfactory or unsatisfactory performance of the tool. In some instances, the data collection device can provide for storing additional information and/or data with any particular stored measured value.

8 Claims, 2 Drawing Sheets

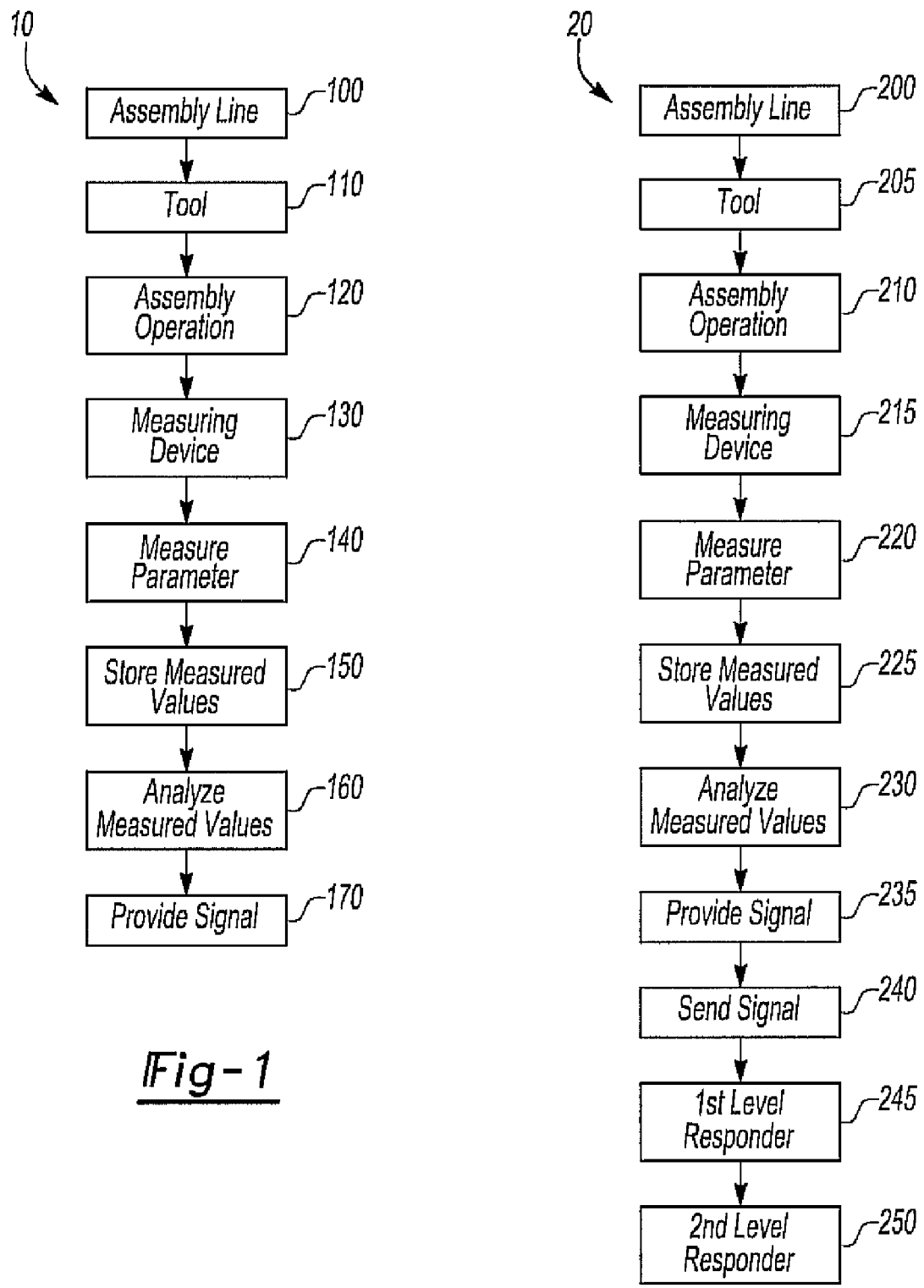

QUALITY CONTROL SYSTEM AND METHOD THEREOF

FIELD OF THE INVENTION

The present invention is directed to a quality control system and method. In particular, the present invention is directed to a quality control system and method for alerting first level and second level responders when an alert signal has been determined.

BACKGROUND OF THE INVENTION

Operational systems such as assembly lines are frequently tested and/or monitored in order to determine whether assembly operations are being performed within specified limits. The assembly operation that is being monitored and/or tested can be the attachment of a component or components onto a machine, the painting or coating of a component and/or machine, the welding of a component or a component onto a machine and the like. Most types of monitoring and/or testing of such an operational system attempt to measure a parameter that is indicative of the performance that has been performed by a tool used in the assembly operation and then compare the measured value of the parameter with a predefined specification limit or limits.

It is not uncommon for such a monitoring or testing system to measure a given parameter and then manually store the measured value onto a sheet of paper, computer spreadsheet and the like. Thereafter, the values in the form of data are analyzed and/or compared to a desirable value or set of criterion limits in order to determine if the assembly operation is being performed properly. However, such types of systems can result in trends and abnormalities occurring within the assembly operation that are difficult to audit and/or notice. Therefore, an improved quality control system and method that measures at least one parameter of an assembly operation that is indicative of a tool performing said operation, stores data related to the measurements, analyzes the data and then notifies an individual or individuals if attention is needed would be desirable.

SUMMARY OF THE INVENTION

A quality control system and method for monitoring an assembly operation is provided. The method can include: (1) providing an assembly line having a plurality of machines being assembled thereon; (2) providing a tool for performing an assembly operation; (3) performing a plurality of the assembly operations with the tool; (4) measuring a measurable parameter indicative of the performance of the tool for at least a subset of the plurality of assembly operations; (5) storing the measured values in an electronic format with a data collection device; (6) analyzing the measured values; and (7) providing a signal based on the analysis with the signal indicative of at least satisfactory or unsatisfactory performance of the tool. In some instances, the data collection device can provide for storing additional information and/or data with any particular stored measured value. When the measurable parameter is torque applied to a threaded fastener, the measurement of the torque can be performed with an electronic torque wrench and a signal indicative of unsatisfactory performance of a power wrench used to tighten the threaded fastener can be provided to a first responder using an email and/or a page notification. In the event that the email and/or page providing the unsatisfactory signal is not responded to within a predetermined and specific amount of time, an additional email and/or page can be sent to a second level responder.

In some instances, the method includes monitoring the assembly of motor vehicles on a motor vehicle assembly line with a tool performing an assembly operation resulting in a measurable parameter indicative of the performance of the tool. After a plurality of the assembly operations have been performed by the tool, measurements of the parameter for at least a subset of the plurality of assembly operations is performed with each measurement providing a value. The values can be stored in an electronic format within a data collection device, with the stored values analyzed and compared with at least one predefined value. Based upon the comparison, a signal is provided which is indicative of at least a satisfactory, cautionary or unsatisfactory performance of the tool. In the event that the signal is indicative of a cautionary or unsatisfactory performance of the tool, the signal can be sent to a first level responder, and then sent to a second level responder if the signal is not responded to by the first level responder within a predetermined amount of time.

BRIEF DESCRIPTION OF THE FIGURES

FIG. 1 is a schematic flow diagram of an embodiment of the present invention;

FIG. 2 is a schematic flow diagram of another embodiment of the present invention.

DETAILED DESCRIPTION OF THE INVENTION

Figure 3:
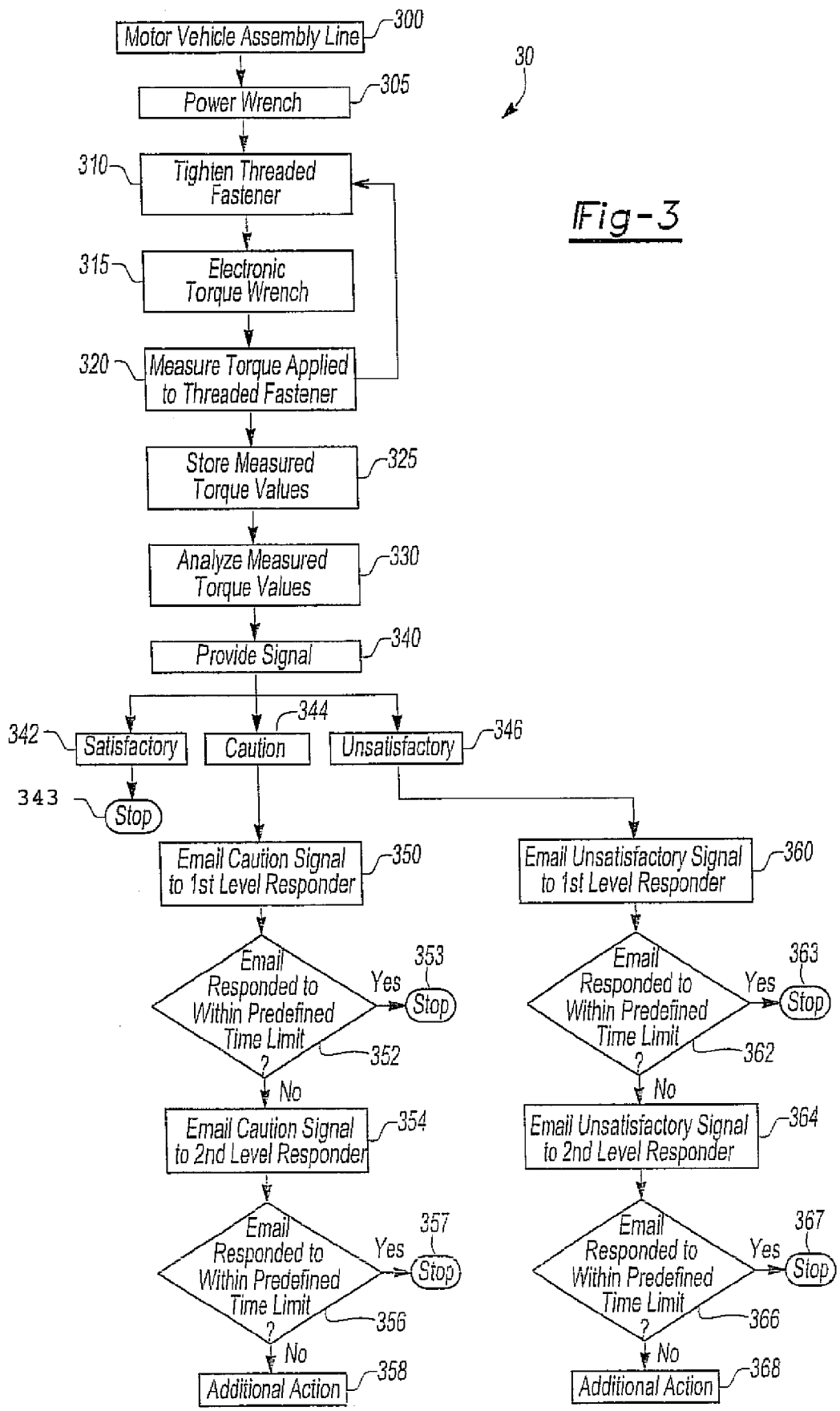
FIG. 3 is a schematic flow diagram of yet other embodiment of the present invention.

The present invention discloses a system and method for monitoring assembly operations on an assembly line. As such, the system and method have utility for improving the manufacture of machines.

The system and method use statistical process control (SPC) to improve the capability of areas such as improved tool capability, reduced reaction time to abnormalities, ease of system auditing and the like. In some instances, the system and method provide for a plant wide or corporate wide real-time access to data and/or related process control charts for one or more assembly operations that are performed on an assembly line. In addition, the system and method provide for email messages and/or pages that alert various individuals associated with the assembly line of a manufacturing problem or potential problem.

The system and method are designed to operate with the assembly line wherein a given assembly operation is performed by a tool, with the use of the tool resulting in a parameter that can be measured and is in fact indicative of the performance of the tool. After the tool performs the assembly operation at one or more locations on a given machine that is being assembled on the assembly line, or one or more locations on a plurality of machines on the assembly line, the parameter for at least a subset of the assembly operations is measured. Each measurement produces a value that is stored in a data collection device as a datum in an electronic format. It is appreciated that the tool can be any tool used in the manufacturing of the machine, illustratively including a wrench, a screwdriver, a paint sprayer, a machining tool, welding machine, a robot and the like. As such, the parameter can be torque applied to a threaded fastener by the wrench, torque applied to a threaded screw by the screwdriver, a thickness of paint applied to a component by the paint sprayer, a physical dimension of a machined component and the like.

The measurement of the measurable parameter can be performed by an electronic measurement device, illustratively including an electronic torque wrench, an electronic paint thickness measurement tool, an electronic caliper and the like. The values of the respective measurements are stored in the data collection device and can be transferred or uploaded to a larger data management system such as a workstation computer, a separate laptop computer, a central mainframe computer, etc.

The hardware for the collection of the measurable parameter data, i.e. the data collection device, can include an interface and is capable of receiving and storing data from a digital or electronic tool. In addition, the data collection device can have the capability of storing a predefined number of parameter measurements. If the measurement tool is an electronic torque wrench, then the torque wrench can accommodate or measure a range of torque values. In addition, the electronic torque wrench would have the capability to measure the torque with different attachment types such as sockets, crows feet, screw head adapters and the like. The electronic torque wrench would also have a measurement variance equal to or less than a specified value, e.g. less than 5% of total variance.

Software for the data collection device can provide for the collection of the measurable parameter data and can be easily configured for a particular assembly operation and/or group of individuals performing the assembly operation. However, modifications to the basic format for the collection of the data are preferably done from a central administrator computer in order to prevent unauthorized changes thereto. Each data collection device has a generic software platform that facilitates the uploading of the data through the software interface. The software also affords for the data to have data tags that allow for traceability of the data with respect to various items. A data tag can be attached to an individual data point using a dropdown menu and can provide for a list of causes as to why a data point is outside a specified limit. In addition, the data tags can include items such as a machine serial number, a supervisor or team leader that has taken the parameter measurement, a particular shift when the reading or data measurement was taken, a particular assembly line where the data measurement was taken, the team of individuals that are responsible for the assembly operation and the like.

The measurement tool hardware and software can also provide measurement control functionality. The measurement control functionality provides for measurement control features such as audible tones that distinguish when the measurement of a measured parameter is within specification limits, above upper specification limits, below lower specification limits and the like. It is appreciated that the tones are loud enough to be audible in a given plant production environment. Optionally included can be a visible light indicator that is activated upon the measurement of the measurable parameter. The light indicator can provide a different colored light for a measurement that is within specification limits, above upper specification limits, below lower specification limits, etc. In addition, the measurement tool can provide a display that provides the actual value of the reading after the measurement has been taken.

In some instances, the measurement tool affords for the data collection sequence to be halted when an out of specification reading is obtained and the software interface can query the operator if they would like to retake or accept the reading. If retake is selected, the individual performs a retake of the reading and that value replaces the first reading. If the individual chooses to accept the reading, the software can prompt the individual for an assignable cause and/or corrective action. It is appreciated that a dropdown style menu can be provided from which the individual can select from a specific number of assignable causes and/or corrective action. It is further appreciated that the selected assignable cause and/or corrective action is data point specific in that it is applied or attached to a single data point.

After a predetermined number of measurements have been taken by the tool, the data collection device affords for a signal to indicate to the individual that the last measurement has been completed. For example, an audible tone, a distinguishable light or the like can be provided in addition to the data collection device not allowing further data entry until the data has been uploaded to a workstation computer. In some instances, the data collection device affords for an individual to clear an entire set of data that has been taken, for example when the individual realizes that an out of sequence measurement has been taken.

The upload of the stored data to a workstation computer, laptop computer, central computer and the like can be relatively simple and quick. In some instances, the data upload can be performed after every round of data collection and an upload program can be separate from an SPC software in order to afford for quick uploads and prevent software startup delays. In fact, the upload program can be kept open and can run continuously. Data can be deleted from the collector after the upload is complete and data transfer is verified. In the alternative, after the data has been uploaded it can be saved within the data collector, however the data collector only accepts new data measurements and only allows for the new data to be uploaded. In addition, the data collector has the functionality of avoiding lost data by ensuring that no data is deleted from the collector until a successful upload transfer has been verified.

The system and method also includes a comprehensive SPC software package that affords for various analysis and auditing. The software can produce charts that plot commonly referred values such as Individual X, moving range (IR) with a subgroup size as specified. In addition, the software affords for toggling between a primary chart such as mean and range (Xbar & R) and a secondary chart, for example IXMR.

Dynamic real time data from the assembly line is provided using the SPC software and other related web-based software known to those skilled in the art. The system can have an auto-refresh function that occurs at regular intervals along with an automatic refresh after new data is uploaded to the workstation computer, the central computer and the like.

Control limits on the charts and/or for the measurement tools can either be calculated by the SPC software or manually set by an individual. In addition, data points on the control charts can be visually distinguishable, illustratively including for example purposes only a green circle for a measurement that is within specification, a red circle for a measurement that is out of specification, an amber triangle for a measurement that is out of control limits and a diamond shape for data points with assignable causes. The SPC software can detect data trends such as out of control limits trends, staggering trends and decreasing trends. Such types of trends can be referred to as data violation tests. The SPC software can also include a number of different screens that can be provided for an individual at a computer. For example, and for illustrative purposes only, the software can include an overall shop status screen, the status of a given team of workers, a screen for the process overview, a screen illustrating a histogram chart, a screen illustrating measurement statistics for a particular assembly operation, and/or an acknowledgement screen that affords for the review and acceptance of the new data that has been uploaded to the system.

The measurement statistics screen can illustrate a number of different statistics that have been performed on the measured data, such statistics known to those skilled in the art and illustratively including mean (Xbar), average of the means (Xbar(dbl)), process capability (Cp), process capability index (Cpk), process capability lower index (Cpl), process capability upper index (Cpu), percentage out of specification, parts per million out of specification and the like. The SPC software also affords for any of the screens to be printed with a relatively wide flexibility for selection of data print ranges, paper size, format and the like.

In some instances, the SPC software is open database compliant (ODBD) and thereby affords for a large degree of flexibility for creating customized data queries for tag field labels, data date ranges, sequence numbers and the like. In addition, the SPC software affords for transportable data in which raw data can be imported into other software programs such as Microsoft Excel and the like. It is appreciated that the SPC software can contain reporting tools which afford for canned or ready-made reports for such data conditions such as out of spec, out of control and the like.

Once the data has been analyzed with the SPC software, alert messaging can be provided using email and/or paging. The emails and/or pages are sent to different individuals and/or groups depending on the type of test or measurement violation, or event flag, that is attached to an uploaded data point. The different groups are structured such that they are characteristic dependent and allow for an email or page alert to be sent to a particular assembly line individual(s) rather than an entire team or group of individuals. The emails and/or pages can be structured in an escalating alarm format complete with feedback or receipt capability. In this manner, the system provides for automatic problem visibility in which if a first level responder does not provide feedback or acknowledge receipt of an alarm email or page within a predetermined amount of time, then another email and/or page is sent to a second level responder for appropriate action to be taken. It is appreciated that third level responders, fourth level responders and the like can be included within the escalating alarm format.

Turning now to FIG. 1, an embodiment of a method for monitoring an assembly operation is shown generally at reference numeral 10. The method 10 provides an assembly line at step 100 and a tool at step 110 capable of performing an assembly operation at step 120. After the assembly operation has been performed at step 120 a measuring device is provided at step 130, the measuring device measuring a measurable parameter at step 140. It is appreciated that the measurable parameter is indicative of the performance of the tool and thus by measuring the parameter a determination of whether or not the tool is functioning properly can be determined. It is further appreciated that a plurality of measurements are taken by the measuring device 130 such that at least a subset of the plurality of measured values are stored at step 150. At step 160, the measured values are analyzed and a signal that is indicative of the performance of the tool is provided at step 170.

Turning now to FIG. 2, another embodiment is shown generally at reference numeral 20 wherein an assembly line is provided at step 200 and a tool that performs an assembly operation is provided at step 205. The tool provides the assembly operation at step 210 and in fact performs a plurality of the assembly operations. At step 220, a parameter that is indicative of the performance of the tool is measured for at least a subset of the plurality of assembly operations using a measuring device at step 215.

The measured values are stored at step 225 and subsequently analyzed at step 230. It is appreciated that the analysis can include a statistical analysis of stored values and/or a comparison to a predefined value or values. Based upon the analysis of the measured values, a signal is provided at step 235, the signal being indicative of satisfactory or unsatisfactory performance of the tool that is provided at step 205. If the signal is indicative of unsatisfactory performance of the tool, the signal is sent at step 240 in order to alert the unsatisfactory performance of the tool. In some instances, the signal can be optionally sent to a first level responder at step 245. The first level responder can have a predetermined time limit in which to respond to the signal and/or take necessary and appropriate action. If the first level responder does not respond to the signal, then the signal can be sent to a second level responder at step 250.

It is appreciated that the signal can be in the form of an email and/or a page. It is further appreciated that the assembly line provided at step 200 can be a motor vehicle assembly line and the tool provided at step 205 can be a power wrench, a power screwdriver, a paint sprayer, a welder, a machining tool, a robot and the like. As such, the assembly operation provided at step 210 would correspond to the specific tool provided at step 205 and illustratively could include the tightening of a threaded fastener, the spraying of paint onto a component, the welding of a component or the welding of a component onto a machine and the like. Likewise, the measuring device provided at step 215 would be appropriately selected depending upon the assembly operation that was performed. Thus corresponding to the above-identified examples, the measuring device could be an electronic torque wrench, an electronic paint thickness measuring device, an ultrasonic or x-ray weld inspection device and the like.

Turning now to FIG. 3, another embodiment is shown generally at reference numeral 30 wherein a motor vehicle assembly line is provided at step 300. It is appreciated that the motor vehicle assembly line is capable of assembling motor vehicles. A power wrench is provided at step 305, the power wrench operable to tighten threaded fasteners at step 310. The threaded fasteners can be a variety of screws, nuts, bolts and the like that are used during the assembly of a motor vehicle on the assembly line and the power wrench could be calibrated to apply a specific amount of torque onto a particular type of threaded fastener.

After a plurality of threaded fasteners have been tightened on a single vehicle and/or on a plurality of vehicles, an electronic torque wrench is provided at step 315 which is used to measure the torque applied to a tightened threaded fastener at step 320. As shown in this figure, the measurement by the electronic torque wrench can be applied a number of times until the torque of at least a subset of the tightened fasteners has been measured and a given quantity of data has been obtained. The measured torque values are stored at step 325 and can be stored in a data collection device that is electronically connected to the electronic torque wrench. After the values have been stored at step 325, the measured values can be analyzed at step 330.

It is appreciated that between step 325 and step 330 the stored torque values can be transferred from the data collection device to a workstation computer, central computer, etc., such that the analysis that occurs at step 330 can be performed by the workstation computer, central computer, etc. with SPC software that can identify trends in the data, perform a statistical analysis on the data, etc. After the data has been analyzed at step 330, a signal can be provided at step 340, the signal indicative as to whether or not the analyzed data and thus the performance of the power wrench are satisfactory, cautionary or unsatisfactory.

If the signal is indicative of satisfactory performance of the power wrench 305, then the signal at step 342 results in no action being taken at step 343. However, if a cautionary signal is provided at step 344, an email or page of the cautionary signal is sent to a first level responder at step 350. Similarly, if an unsatisfactory signal is provided at step 346, an email and/or page of the unsatisfactory signal is sent to a first level responder at step 360. It is appreciated that the first level responder at step 350 and the first level responder at step 360 may or may not be the same individual or group of individuals. After the email and/or page is provided at step 350 and/or step 360, the system and method can determine whether or not the email and/or page has been responded to within a predetermined time limit. For example, if a cautionary email is sent at step 350, then the first level responder can have 30 minutes, an hour, a day, etc. in order to respond to the email and/or page. In the alternative, if the signal is indicative of unsatisfactory performance of the tool, the first level responder at step 360 could have live minutes, 10 minutes, 15 minutes, 30 minutes and the like to respond to the email and/or page. If a response is provided to the email at step 352, then no further action is needed and the alert is closed or stopped at step 353. In the alternative, if the email is not responded to within the predefined time limit, then the email is sent to a second level responder at step 354. Thereafter, the system provides for additional action to be taken at step 358 if the email to the second level responder is not responded to within a predetermined time limit at step 356. In the alternative, if the email is responded to at step 356 then the alert can be closed or stopped at step 357. Also shown is an analogous series of steps for when an unsatisfactory signal is provided to the first level responder at step 360.

It is appreciated that the system and method disclosed herein can be used for a variety of assembly operations such as torque control for threaded fasteners, weld quality for welding machines, gap and flush data for adjacent panels on a motor vehicle, coordinate measurement machine (CMM) measurements, depth of cut data for airbag notches and the like. In this manner, control of assembly operations with automatic problem visibility is provided.

The invention is not restricted to the illustrative examples described above. The examples are not intended as limitations on the scope of the invention. Methods, apparatus and the like described herein are exemplary and not intended as limitations on the scope of the invention. Changes therein and other uses will occur to those skilled in the art. The scope of the invention is defined by the scope of the claims.

We claim:

1. A method for monitoring an assembly operation, the method comprising:
    providing a machine assembly line having a plurality of machines being assembled;
    providing a power wrench for tightening a threaded fastener and being calibrated to provide torque within a specification limit, the tightening of the threaded fastener resulting in a measurement of torque applied to the threaded fastener by the power wrench;
    performing a plurality of tightening operations on a plurality of threaded fasteners using the power wrench;
    measuring the torque applied by the power wrench for at least a subset of the plurality of tightening operations, each measurement providing a torque value;
    storing the torque values within a data collection device in an electronic format;
    analyzing the measured torque values;
    comparing the analysis of the measured torque values to at least one predefined torque value; and
    providing a signal to a first level responder based on the comparison of the analysis of the measured torque values to the at least one predefined torque value, the signal indicative of the power wrench providing torque values within or without the specification limit.

2. The method of claim 1, wherein the data collection device provides for storing additional data with any particular stored measured value.

3. The method of claim 1, wherein the power wrench is an electronic torque wrench.

4. The method of claim 1, wherein the signal is provided to the first level responder by an email and/or page.

5. The method of claim 4, further including providing the signal in an escalating alarm format to a second level responder if the unsatisfactory signal provided to the first level responder is not responded to within a predetermined amount of time.

6. The method of claim 5, wherein the signal is provided to the second responder by an email and/or page.

7. The method of claim 1, further including uploading the stored torque values from the data collection device to a computer wherein the steps of analyzing and comparing the stored torque values are carried out by the computer.

8. The method of claim 3, wherein the electronic torque wrench is part of a robot for placing exterior panels onto a motor vehicle.

* * * * *